UNITED STATES PATENT OFFICE.

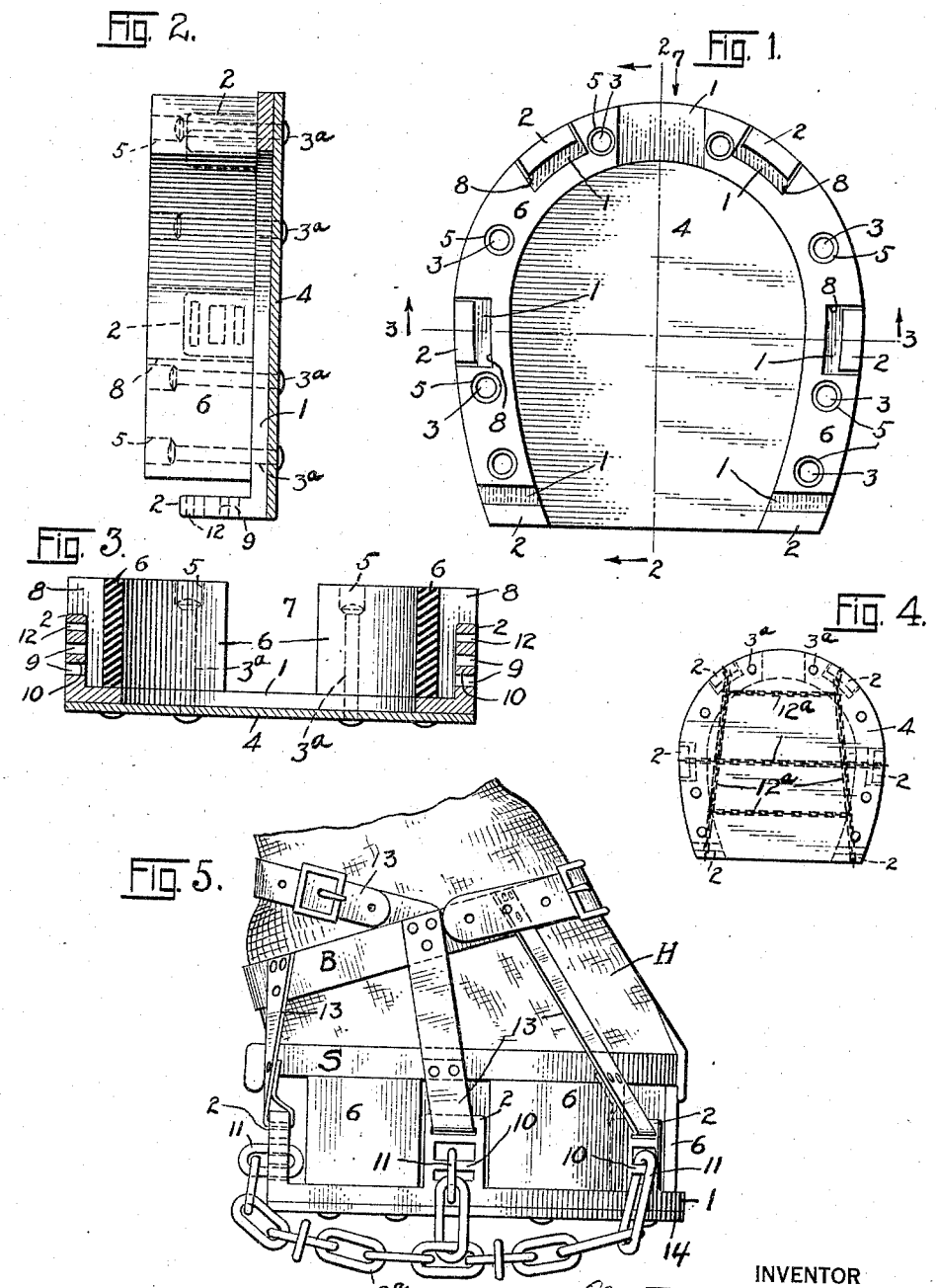

MATTHEW M. O'BRIEN, OF BROOKLYN, NEW YORK.

SLIP-RESISTING OVERSHOE FOR ANIMALS.

1,303,373.     Specification of Letters Patent.     Patented May 13, 1919.

Application filed March 1, 1919. Serial No. 280,050.

*To all whom it may concern:*

Be it known that I, MATTHEW M. O'BRIEN, a citizen of the United States, residing at borough of Brooklyn, city of New York, county of Kings, and State of New York, have invented certain new and useful Improvements in Slip-Resisting Overshoes for Animals, of which the following is a specification.

This invention is a slip-resisting overshoe for horses and other animals, the objects being simplicity and durability of construction and protection of the frog of the hoof or foot.

In the accompanying drawings forming a part hereof and illustrating the best form of my invention now known to me, Figure 1 is a top plan view of my new overshoe with the means for detachably holding it on a hoof removed and with its bottom tread chain removed.

Fig. 2 is a lengthwise sectional view, at line 2—2 of Fig. 1, of the structure shown in Fig. 1.

Fig. 3 is a transverse sectional view, at line 3—3 of Fig. 1, of the structure shown in Fig. 1.

Fig. 4 is an under plan view of the overshoe showing one arrangement of a slip-resisting bottom chain tread.

Fig. 5 is a side elevational view of a horseshoe hoof provided with my new overshoe having a skeletonized boot or harness for holding the overshoe on the hoof, and with the bottom loose tread chain in a dangling position.

In that form of the invention shown in the drawings, 1 is a horseshoe-shaped chain and strap holder formed with six upstanding slotted lugs 2 spaced apart one from another and also formed with marginal rivet holes 3 at suitable intervals apart. The under side of the holder 1 is provided with a frog-protecting plate 4 having marginal rivet-holes registering with the rivet holes 3 through the holder. This frog-protecting plate wholly spans the space between the inner wall of the horseshoe-shaped holder which is preferably a drop-forging of suitable metal. The holder and plate are fixed together by rivets 3ª through the registering rivet holes of the holder and plate, the upper heads of the rivets as shown being socketed in the enlarged upper end portions of rivet-holes 5 with which each of two upstanding, hoof-supporting, side lugs 6 that are preferably of rubber and are located on the upper sides of the holder, are provided; the frog-protecting plate, holder, and hoof-supporting blocks all being held immovably together by the rivets. At the front of the holder the ends of the side blocks 6 are preferably spaced apart to form a space 7 for reception of the toe calk, if any, of a horseshoe S on the hoof H. The hoof-supporting side blocks extend upwardly above the upper ends of the holder lugs 2, and are formed on their outward sides with recesses 8 each for reception of a lug 2 and out of lateral contact therewith in order to permit access to the lugs for convenience in assembling the tread chain and the holding straps or members of whatever means are used for attaching the overshoe to the hoof of the animal. The back ends of the upstanding side blocks terminate short of the back lugs 2 in order to permit convenient access to the back lugs for conveniently assembling the tread chain and the straps. Each lug 2 is formed with three slots, the two under slots 9 being spaced apart and separated by a cross-bar 10 which is a part of the lug, and these two slots and the cross-bar are for the reception and holding of an upper link 11 of a loose tread chain structure, members of which are indicated by 12ª. The upper slots 12 of the lugs 2 are for reception of members such as the straps 13 of a harness or boot which is generally indicated by B, whereby the overshoe is secured to the animal's foot. The loose tread-chain structure comprises forwardly and rearwardly-extending chain members and cross chain members 12ª, the arrangement of which may be greatly varied but which form a slip-resisting tread; and being by preference loose under the frog-protecting plate, tend to clear the tread chain assemblage when it is in use, of mud, snow and ice. The loose chain also effects a better grip and slip-resisting surface than would be the case if the chain were tight across the under side of the frog-protecting plate which prevents contact of the frog of the animal's foot with the ground and with the underlying chain, the hoof-supporting side-blocks on which the horseshoe S or hoof H rests supporting the animal's foot above and out of contact with the plate 4. Various changes may be made in my new overshoe without departure from the invention. If the upper ends of the rivets were flush with the top sides of the hoof-supporting blocks, there would be a tendency to force their inner ends downwardly below the plate, if the blocks were elastic as preferred; and it is therefore deemed preferable to countersink the upper ends of the rivets.

What I claim is:—

1. An overshoe for animals comprising a rigid chain-holder provided with upstanding chain-holding lugs and having a frog-protecting plate, upstanding hoof-supporting means fixed to the holder, and a bottom slip-resisting chain structure provided with members fixed to said lugs.

2. In the overshoe set forth in claim 1, the chain being loose under the overshoe.

3. In the overshoe set forth in claim 1, the lugs being provided with openings for reception of means whereby any device for holding the overshoe in place on an animal's foot may be connected with the holder.

4. In the overshoe set forth in claim 1, the holder and the frog-protecting plate being separate members, and the hoof-supporting means comprising elastic blocks, the holder plate and blocks being secured together by fasteners.

5. In the overshoe set forth in claim 1, the holder and the frog-protecting plate being separate members, and the hoof-supporting means comprising elastic blocks, the holder plate and blocks being secured together by fasteners the heads of which are sunk below the upper surface of the elastic blocks.

In testimony whereof I have hereunto set my hand this 25th day of February, 1919.

MATTHEW M. O'BRIEN.

Copies of this patent may be obtained for five cents each, by addressing the "Commissioner of Patents, Washington, D. C."